O. C. JANSSEN.
TENNIS NET REEL.
APPLICATION FILED JULY 10, 1917.
1,300,972.
Patented Apr. 15, 1919.
2 SHEETS—SHEET 1.
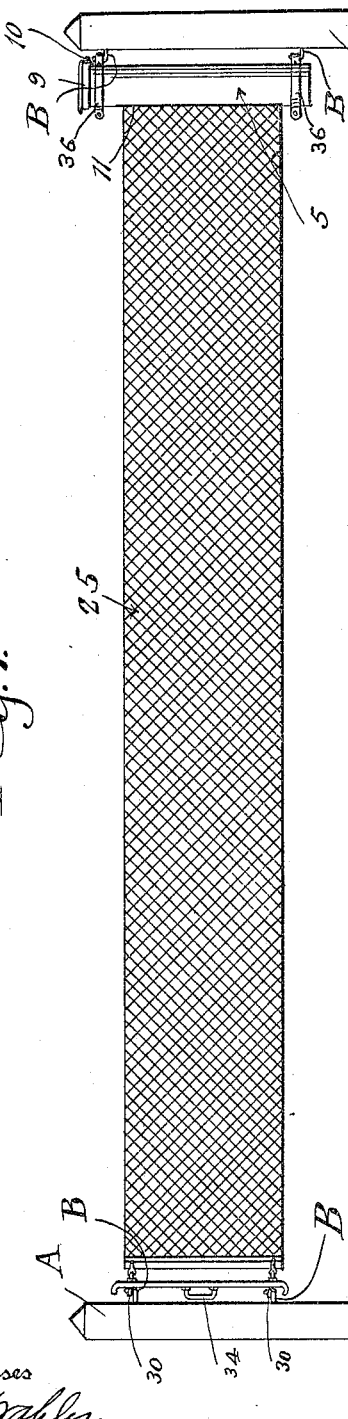
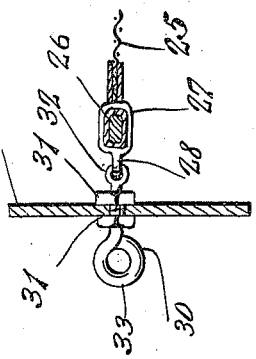
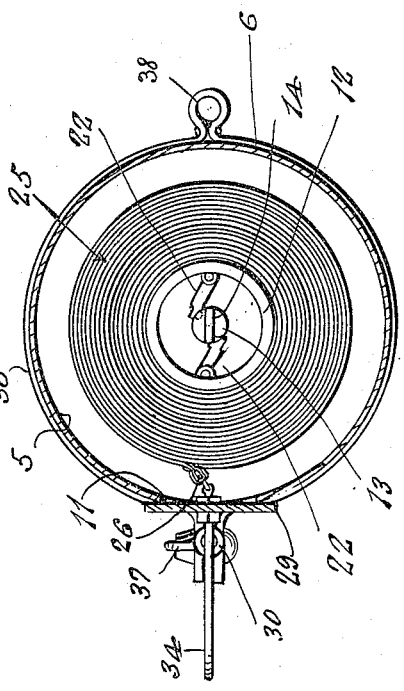
Inventor
O. C. Janssen.

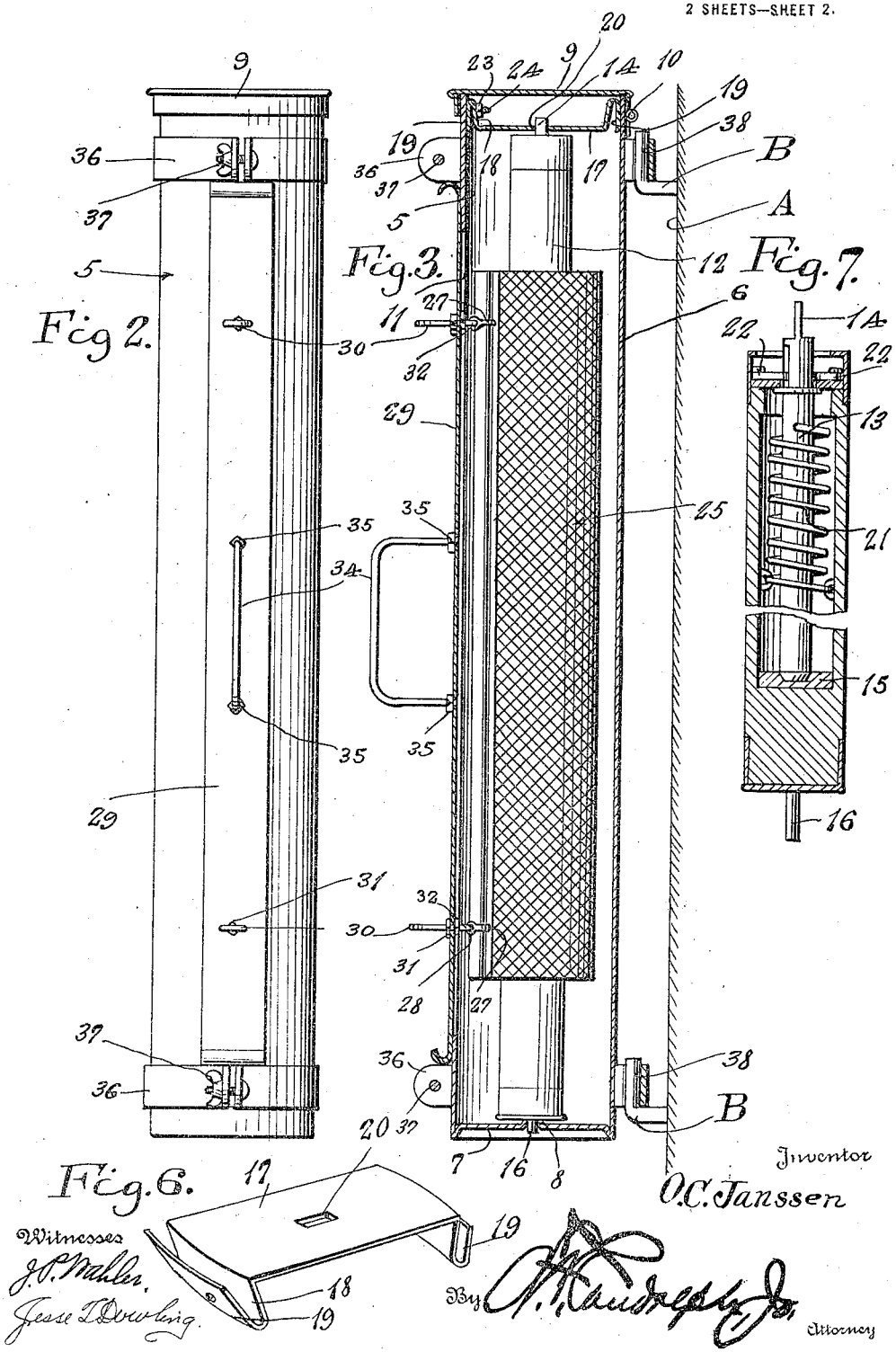

UNITED STATES PATENT OFFICE.

OTTO C. JANSSEN, OF DELMAR, IOWA.

TENNIS-NET REEL.

1,300,972.  Specification of Letters Patent.  Patented Apr. 15, 1919.

Application filed July 10, 1917.  Serial No. 179,690.

*To all whom it may concern:*

Be it known that I, OTTO C. JANSSEN, a citizen of the United States, residing at Delmar, in the county of Clinton and State of Iowa, have invented certain new and useful Improvements in Tennis-Net Reels; and I do hereby declare the following to be a full, clear, and exact description of the invention, such as will enable others skilled in the art to which it appertains to make and use the same.

This invention relates to improvements in a tennis net reel.

The object of this invention is to provide a net reel whereby the tennis net may be quickly strung up between the posts and the maximum position of the net obtained in a quick and reliable manner.

A still further object of this invention is to provide a reel embodying a casing, in which is rotatably mounted a net, the casing being adapted to be removably supported upon one of the posts and the net adapted to be withdrawn from the casing and removably secured to the opposing face of the other post, thus the net is stretched across the court in a quick and reliable manner, without the necessity of the tying and pulling of the ropes around the posts.

A still further object of this invention is to provide a casing in which the net is rotatably positioned, thus the net is protected from the weather, should the same be left out over night.

A still further object of this invention is to provide a casing having a hinged cover at one end to facilitate the removing of the net should it be desired to repair the same.

A still further object of this invention is to provide a tennis net reel and stretcher of this character, which will be simple, practical and comparatively inexpensive in construction and one that can be manufactured and sold at a low cost.

With these and other objects in view, the invention consists in the novel combination and arrangement of parts hereinafter more fully described and set forth in the claims hereto appended.

In the drawings:

Figure 1 is a front elevation illustrating the net set up and ready for use,

Fig. 2 is a front elevation of the casing,

Fig. 3 is a longitudinal sectional view of the casing, illustrating the manner in which it is attached to the posts, Fig. 4 is a transverse sectional view of the casing, Fig. 5 is a detail sectional view of the manner in which the stretching member is applied to the free end of the net, Fig. 6 is a perspective view of the pintle bearing, Fig. 7 is a longitudinal sectional view taken through the spring roller upon which the net is adapted to be wound.

Like numerals of reference designate corresponding parts in all the figures of the drawings.

Referring to the drawings, the letter A designates the spaced posts of any suitable configuration now in general use and embedded in a tennis court. The opposing faces of the posts are provided with the spaced vertically alined hooks B upon which my improved tennis net reel and stretcher is adapted to be removably secured.

My improved reel is designated in its entirety by the numeral 5 and it comprises in its construction, a cylindrical casing 6 having one end closed as at 7 and its opposite end being fully open. The closed end 7 is provided centrally with a spring roller pintle receiving opening 8. The open end of the cylindrical casing has fitted thereon, a hinged cover 9, which is hinged thereto as at 10. The casing 6 is provided in its wall with a longitudinally extending slot 11, which terminates adjacent each end of the casing thereof.

A spring roller 12 is mounted in the casing 6, said roller having rotatably mounted therein, a rod 13, which rod has its outer end provided with a squared pintle 14, and its opposite end is arranged in a bearing 15 located in the roller 12. A round pintle 16 is secured to the opposite end of the roller and is adapted to extend through the opening 8 in the closed end of the casing. The roller is adapted to be positioned longitudinally within the casing until the pintle 16 registers with the opening 8 and is journaled therein.

A bearing 17 formed of a single piece of metal has a flat body, the ends of which are bent downwardly and inclined inwardly as at 18 to provide supporting flanges, the terminals of said supporting flanges being bent upwardly and diverging outwardly as at 19 to provide retaining flanges, which are adapted to engage the interior of the casing 6 adjacent the open end thereof. The plate 17 is provided centrally with a longitudinally extending rectangular slot 20, which is adapted to receive the squared pintle 14 and rod 13 of the spring roller to permit the coiled spring 21 wound about said rod to be placed under tension, and this spring and rod are held under tension by the usual dogs 22, carried by one end of the spring roller 12 as shown in Fig. 4, thus it can be seen that the rod 13 may be placed under tension through the medium of the spring 21 and held under tension by the pintle 14 extending through the squared opening 20 in the bearing plate 17, which is removably fitted in the open end of the casing 6. The bearing member 17 is held against accidental removal by a transverse bolt 23, which has fitted on one end, a nut 24 to prevent the accidental displacement of the bearing member from the open end of the casing should the cover 9 become open.

The tennis net has one end secured to the roller and is rotatably wound thereon as shown in Figs. 1, 3 and 4 of the drawings, and its opposite end is adapted to be drawn through the slot 11 in the wall of the casing 6. The free end of the net 25 is provided with the usual rod 26, about which is arranged the clamping bands 27, which bands are located at a spaced distance apart and are provided with eyes 28.

A rectangular stretching plate 29 is secured to the eyes 28 through the medium of the swivels 30, which extend transversely through the plate 29 and are arranged at a spaced distance apart. The swivels are connected to the plate 29 by suitable stop washers 31, which are arranged on the opposing faces of the plate as shown in Fig. 5 and the inner end of the swivels is connected to the eyes 28 as at 32, and the outer end terminates in an eye 33, which is adapted to be removably arranged over the hooks B on the opposing face of one of the posts A as shown in Fig. 1.

The plate 29 is provided on its outer face centrally of its ends with a substantially U-shaped handle 34, which is secured by its leg portions to the plate as at 35, thus it can be seen that the net may be readily drawn from the casing and fastened to the opposing posts A as shown in Fig. 1.

A pair of clamping rings 36 are removably secured on the exterior of the casing adjacent each end thereof by suitable bolts and wing nuts 37. The rings are provided with vertical bearings 38, which removably position the casing 6 upon the hooks B of one of the posts A, and arrange the casing in a vertical or parallel position with the posts A. It is to be understood that the plate 29 closes the slot 11 when the net 25 is wound upon the roller 12 and is located in the casing, thus it can be seen that the net is preserved and prevented from coming in contact with damp weather.

In use, the casing is removably arranged on the hooks B of one of the posts A and the handle 34 is then grasped and the operator walks toward the opposite post A, drawing the net from the casing and then arranging the eye 33 over the hooks B on the opposing face of the other post A, and the net is then in set up position. It is only necessary when taking the net down to release the hook 33 from the hooks B, grasp the handle and give a light outward jerk, causing the spring 21 to actuate, thus rotatably wind the net 25 back upon the roller 12 in the casing 6, and the device is ready to be taken down.

It is to be understood that a device constructed in accordance with this invention is simple and reliable and one that can be manufactured and sold at a comparatively small cost.

What is claimed is:

1. In a tennis net reel the combination with a slotted casing, a spring acting roller within said casing, and a net mounted on said spring acting roller, and posts outside said casing and engageable therewith and with said net, of a closing plate at the outside of and covering the slotted part of the casing and all around the edges of said slot, means to secure said net to said covering plate, and fastening means outside said plate and engageable with any of said posts.

2. In a tennis net reel the combination with a slotted casing, a spring acting roller within said casing, and a net mounted on said spring acting roller, and posts outside said casing and engageable therewith and with said net, of a substantially rectangular closing and covering plate at the outside of and covering the slotted part of said casing, and extending beyond the edges of said slot, fastening means, swivelly secured outside and inside of said plate, and engageable with said net at the inside of the plate, and engageable with said posts at the outside of the plate.

3. In a tennis net reel the combination with a slotted casing, a spring acting roller within said casing, and a net mounted on said spring acting roller, and posts outside said casing and engageable therewith and with said net, of a substantially rectangular closing and covering plate at the outside of and covering the slotted part of said casing and extending beyond the edges of the slot, fastening means swivelly secured at the inside of said plate and engageable with said net, clamping and fastening means on said posts, swivelly mounted securing means at the outside of said plate and in axial alinement with the inside swivelly mounted securing means and engageable with said clamping and fastening means.

In testimony whereof I affix my signature in presence of two witnesses.

OTTO C. JANSSEN.

Witnesses:
 HARRY GEISLER,
 LOUIS O. SMITH.

Copies of this patent may be obtained for five cents each, by addressing the "Commissioner of Patents, Washington, D. C."